(12) United States Patent
Fitch

(10) Patent No.: US 8,334,012 B2
(45) Date of Patent: Dec. 18, 2012

(54) METHOD FOR PREPRINTING AND/OR RELIQUIFYING SUBPIXELS TO ACHIEVE COLOR UNIFORMITY IN COLOR FILTERS

(75) Inventor: John S. Fitch, Los Altos, CA (US)

(73) Assignee: Palo Alto Research Center Incorporated, Palo Alto, CA (US)

( * ) Notice: Subject to any disclaimer, the term of this patent is extended or adjusted under 35 U.S.C. 154(b) by 573 days.

(21) Appl. No.: 11/017,326

(22) Filed: Dec. 20, 2004

(65) Prior Publication Data

US 2006/0134316 A1 Jun. 22, 2006

(51) Int. Cl.
*B05D 5/06* (2006.01)
(52) U.S. Cl. ......................... 427/165; 427/162
(58) Field of Classification Search .................. 427/162, 427/66
See application file for complete search history.

(56) References Cited

U.S. PATENT DOCUMENTS

| | | | |
|---|---|---|---|
| 5,540,147 A * | 7/1996 | Johnson | 101/211 |
| 5,989,757 A | 11/1999 | Satoi | |
| 6,064,454 A | 5/2000 | Kim et al. | |
| 6,287,636 B1 | 9/2001 | Kokubo et al. | |
| 6,290,352 B1 | 9/2001 | Marumoto et al. | |
| 6,309,783 B1 | 10/2001 | Shiba et al. | |
| 6,331,384 B1 | 12/2001 | Satoi | |
| 6,524,757 B2 | 2/2003 | Koike et al. | |
| 6,667,795 B2 | 12/2003 | Shigemura | |
| 6,677,243 B2 | 1/2004 | Okada et al. | |
| 6,776,844 B2 | 8/2004 | Yonekura et al. | |
| 7,354,520 B2 | 4/2008 | Okada et al. | |
| 2002/0025481 A1 | 2/2002 | Koike et al. | |
| 2002/0057401 A1 | 5/2002 | Ita | |
| 2002/0149313 A1 | 10/2002 | Yonekura et al. | |
| 2002/0182522 A1 | 12/2002 | Sabnis et al. | |
| 2003/0035917 A1 | 2/2003 | Hyman | |
| 2003/0087073 A1 * | 5/2003 | Kobayashi | 428/209 |
| 2003/0113640 A1 | 6/2003 | Sabnis et al. | |
| 2003/0201550 A1 | 10/2003 | Yonekura et al. | |
| 2004/0048197 A1 | 3/2004 | Sabnis et al. | |
| 2004/0149834 A1 | 8/2004 | Shimoda et al. | |
| 2005/0181287 A1 | 8/2005 | Yamada | |

FOREIGN PATENT DOCUMENTS

| | | |
|---|---|---|
| EP | 0 683 405 A1 | 11/1995 |
| EP | 1 271 243 A2 | 2/2003 |
| JP | 03056902 | 12/1991 |
| JP | 10-123500 | 5/1998 |
| JP | 2001-343518 | 12/2001 |
| JP | 2002 122727 A | 4/2002 |
| JP | 2003-232912 A | 8/2003 |
| JP | 2004-170463 A | 6/2004 |

OTHER PUBLICATIONS

European Search Report.

* cited by examiner

*Primary Examiner* — Timothy Meeks
*Assistant Examiner* — Elizabeth Burkhart
(74) *Attorney, Agent, or Firm* — Fay Sharpe LLP

(57) ABSTRACT

A first fluid, e.g., a clear solvent, is printed in a subpixel of a color filter prior to printing droplets of a second fluid such as colored liquid into the subpixel areas. This first fluid could have surface wetting properties such that it is hydrophilic to the substrate (glass) but hydrophobic to the boundary (black matrix). Therefore, the first fluid would flow over the entire subpixel area, but not onto the black matrix. The first fluid would then allow color fluid to disperse uniformly throughout the subpixel. This first fluid may also be used in additional embodiments to re-liquify a dry or partially dry color subpixel, so that color non-uniformities can be corrected.

25 Claims, 4 Drawing Sheets

METHOD FOR PREPRINTING AND/OR RELIQUIFYING SUBPIXELS TO ACHIEVE COLOR UNIFORMITY IN COLOR FILTERS

BACKGROUND

The present exemplary embodiments relate to a method for preprinting and/or re-liquifying subpixels to achieve color uniformity in color filters. It finds particular application in conjunction with formation of color filters that are used in various displays such as liquid crystal displays and the like, and will be described with particular reference thereto. However, it is to be appreciated that the present exemplary embodiments are also amenable to other like applications.

By way of background, formation of color filters has been accomplished in a number of different manners. In one traditional technique, a black matrix defining pixels and subpixels for each of the color filter elements is formed on a glass substrate. Then, the glass substrate and the black matrix is appropriately masked so that a first color (e.g., green) can be applied to various subpixel areas. After the first color is applied, the mask is removed and the substrate and black matrix are masked in a different manner to accommodate a second color (e.g., blue) to be printed. After the second color is applied, the mask is removed and a third mask is applied to the substrate and matrix so that a third color (e.g., red) can be formed on the color filter.

The obvious drawbacks to this approach are that it is costly and time consuming. Use of multiple masks makes it difficult to efficiently process and form a color filter according to these techniques. Other similar processes for forming color filters have been used, but these other techniques generally require many iterations, such as the ones described above.

Formation of color filters using ink droplet printing techniques has become popular recently. However, the ink droplet printing techniques result in a variety of different problems. For example, if color filter subpixels that are printed using inkjet techniques do not dry uniformly, e.g. if they have dye or colorant distributed unevenly across the subpixel, then the transmitted color intensity may be also be non-uniform.

In addition, if it is desired to add or subtract drop quantity from a subpixel as they are being printed (as oftentimes occur), it is difficult to evenly distribute the modified number of drops across the subpixel so the colorant is uniform. For example, if 20 drops are normally printed evenly across the pixel, but the process is adjusted to 18, a new firing pitch is required to spread the drops out evenly. If the drops dry too quickly, they may not spread out properly and the drop size (or marked spot) might need to be adjusted. If these adjustments are not made, non-uniformities and scallops along the edge of the subpixel may occur.

Further, the surface wetting properties between the colored liquids and the boundaries of the subpixel (the black matrix) may not be sufficient to keep the liquid from spreading into neighboring subpixels. This can be a problem since mixing the red with the green would be catastrophic in terms of producing a useful color filter.

To further illustrate with reference to FIG. 1, a full pixel 10 having RGB subpixels 12 is shown. It should be understood that the full pixel 10 is typically repeated many hundreds or thousands of times across a suitably sized glass substrate that is ultimately used in the manufacture of displays such as liquid crystal displays. It should be further understood that the subpixels will typically be of red, green and blue color, respectively. A black matrix 14 frames each subpixel 12. The black matrix not only serves as a border element between colored subpixels 12, but also serves to provide contrast to the images that will ultimately displayed on the display. This partially completed pixel 10 shows how spots from droplet printing might create the subpixels. It can be seen that if the droplets, such as that shown at 16, do not cover the entire substrate, bright spots or scallops 22 occur. Looking at two red droplets 16 and 18 in an exploded view, coffee staining 20 can be seen in the radial distribution of the drops. Coffee staining is a drying phenomenon that occurs and typically results in lighter or darker coloring around the edges as shown by the reference numeral 20 as well as slight discoloration in the center of the printhead droplet. This staining is caused by non-uniform colorant distribution during drying. Of course, this causes non-uniform color in the subpixel.

BRIEF DESCRIPTION

In accordance with one aspect of the present exemplary embodiments, a method for forming a color filter on a substrate comprises forming a plurality of boundary elements on the substrate, the boundary elements defining a plurality of pixel areas, each pixel area comprised of subpixel areas, selecting at least one subpixel area, applying a first fluid to the selected subpixel area, and, emitting at least one drop of a second fluid into the first fluid within the selected subpixel area.

In accordance with another aspect of the present exemplary embodiments, the substrate is formed of glass.

In accordance with another aspect of the present exemplary embodiments, the boundary elements form a black matrix.

In accordance with another aspect of the present exemplary embodiments, the first fluid is a solvent.

In accordance with another aspect of the present exemplary embodiments, the first fluid is clear.

In accordance with another aspect of the present exemplary embodiments, the applying comprises emitting the first fluid from a print head.

In accordance with another aspect of the present exemplary embodiments, the applying comprises dipping the substrate into the first fluid.

In accordance with another aspect of the present exemplary embodiments, the first fluid wets to the substrate.

In accordance with another aspect of the present exemplary embodiments, the first fluid does not wet to the boundary elements.

In accordance with another aspect of the present exemplary embodiments, the emitting comprises emitting one of red, green, or blue fluid from a print head.

In accordance with another aspect of the present exemplary embodiments, a method for forming a color filter on a substrate having formed thereon a plurality of boundary elements, the boundary elements defining a plurality of pixel areas, each pixel area comprised of subpixel areas, comprises selecting at least one subpixel area, applying a first fluid to the selected subpixel area, and, emitting at least one drop of a second fluid into the first fluid within the selected subpixel area.

In accordance with another aspect of the present exemplary embodiments, applying the first fluid comprises applying a solvent.

In accordance with another aspect of the present exemplary embodiments, applying the first fluid comprises applying a clear fluid.

In accordance with another aspect of the present exemplary embodiments, applying comprises emitting the first fluid from a print head.

In accordance with another aspect of the present exemplary embodiments, applying comprises emitting the first fluid from a print head.

In accordance with another aspect of the present exemplary embodiments, emitting comprises emitting one of red, green, or blue fluid from a print head.

In accordance with another aspect of the present exemplary embodiments, a method for providing uniformity in color to a color filter, the color filter being formed on a substrate having formed thereon a plurality of boundary elements, the boundary elements defining a plurality of pixel areas, each pixel area comprised of subpixel areas, comprises identifying at least one subpixel area that is non-uniform in color, and, applying a first fluid to the identified subpixel area.

In accordance with another aspect of the present exemplary embodiments, applying the first fluid comprises applying a solvent.

In accordance with another aspect of the present exemplary embodiments, applying the first fluid comprises applying a clear fluid.

In accordance with another aspect of the present exemplary embodiments, applying comprises emitting the first fluid from a print head.

DETAILED DESCRIPTION

A first fluid, e.g., a clear solvent, is printed in a subpixel of a color filter prior to printing droplets of a second fluid such as colored liquid into the subpixel areas. This first fluid could have surface wetting properties such that it is substantially hydrophilic to the substrate (glass) but substantially hydrophobic to the boundary (black matrix). Therefore, the first fluid would flow over the entire subpixel area, but not onto the black matrix. The first fluid would then allow color fluid to disperse uniformly throughout the subpixel. This first fluid may also be used in additional embodiments to re-liquify a dry or partially dry color subpixel, so that color non-uniformities can be corrected by extended diffusion of the colorant, or by allowing additional colorant drops to be added and spread across the entire subpixel.

Figure 1:
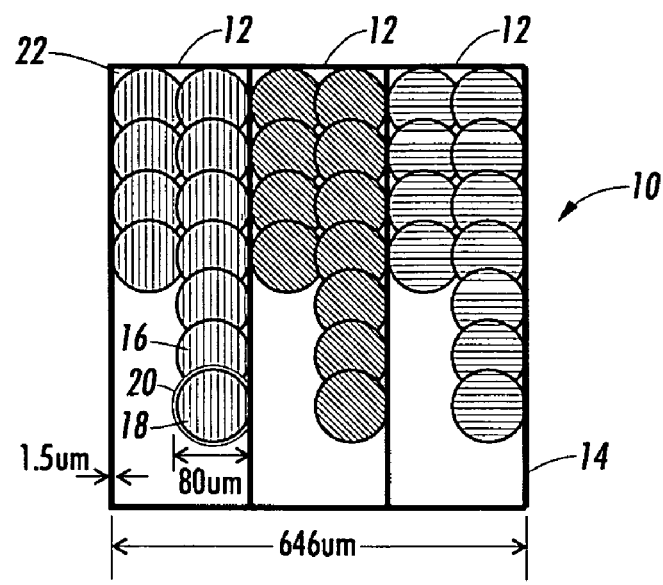
FIG. 1 is an illustration showing the difficulties addressed by the presently described embodiments.
Figure 2:
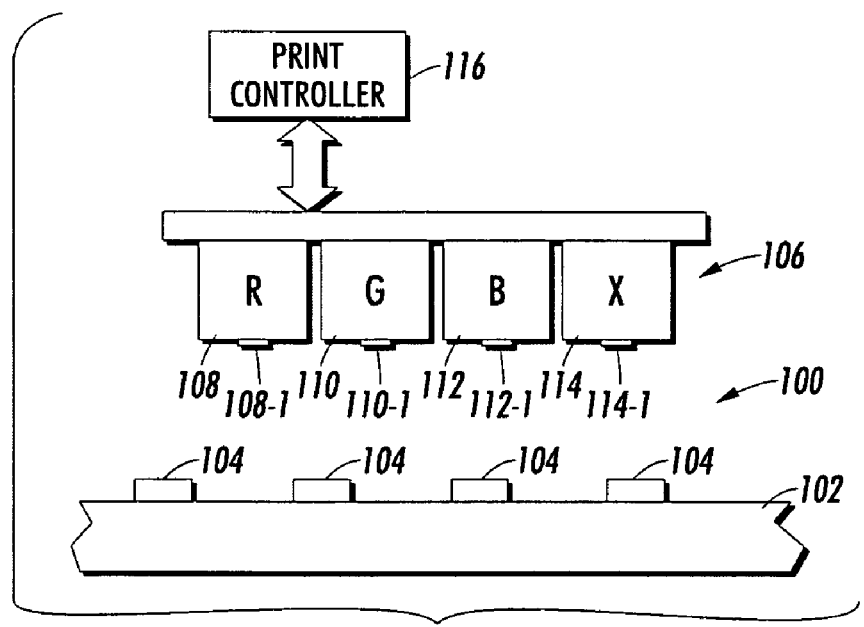
FIG. 2 is a system to which the presently described embodiments may be applied.

The advantages of the presently described embodiments should be apparent to those skilled in the art. For example, the colorant or dye is uniformly dispersed across the subpixel, as the liquid dries. These embodiments allow for printing of all colored fluid in the same, relatively non-precise location because, as noted, the preprinted first fluid (e.g., clear solvent) allows the colorant to disperse across the subpixel uniformly before it dries. In this regard, the clear or uncolored liquid that is applied to the subpixel possesses wetting properties such that it is hydrophilic to the glass substrate but hydrophobic to the boundaries, or black matrix. Thus, the liquid stays within the defined boundaries (e.g., the black matrix). By creating a uniform liquid layer throughout the subpixel, thus facilitating the uniform distribution of color throughout the clear liquid layer, non-uniformities, such as unevenly distributed colorant or dyes and non-colored scallops, are avoided. With reference now to FIG. 2, an arrangement 100 is illustrated. The arrangement 100 shows a substrate 102 having boundary elements 104 formed thereon. It should be understood that the substrate 102 may take a variety of forms that are used in formation of the displays contemplated herein. In one form, the substrate 102 is made of a glass material. Further, it should be understood that the boundary elements 104, in one form, take the form of a black matrix, which is known in the art. Typically, a black matrix will be formed of oxides, photoimagable polymers or polyimides. As is known, the black matrix material is spun onto the glass substrate in the form of a light sensitive polymer. This polymer is then masked and exposed so that it suitably hardens. The unmasked areas are then etched to form the final black matrix. It should be understood that other methods of manufacturing the black matrix exist, such as precision printing. Depending on the materials being used, such as the first and second liquids noted above, the black matrix may possess a variety of wetting characteristics rendering it hydrophilic or hydrophobic in different situations. It will be understood that, for example, it may be acceptable in some cases if the first fluid wets to the black matrix to some degree. The first fluid, in covering all of the clear subpixel, facilitates improved color uniformity. As long as the amount of first fluid does not migrate too far up and over the black matrix, the colorant may still be prevented from spreading into the next subpixel. It may be acceptable if some color migrated onto the black matrix. Therefore, good uniformity and spreading could be realized with first clear fluid which does wet, at least to some extent, to the black matrix.

The system further includes a printhead assembly 106 having various printhead elements included therein. It will be understood that the printhead assembly 106 may take a variety of forms that are well known to those skilled in the art. For example, in one form, a red printhead element 108 having a nozzle array 108-1 is shown. Also, a green printhead element 110 having a nozzle array 110-1 is shown. A blue printhead element 112 having a nozzle array 112-1 may also be included in the printhead assembly 106. Last, as an alternative, a printhead element 114 having a nozzle array 114-1 may be included within the printhead 106. The element 114, in one form, is used to print a first liquid (e.g., a clear liquid) into the subpixels of the black matrix of the color filter in accordance with the presently described embodiments. It should be understood that the element 114 may not be necessary to implement the presently described embodiments if the first liquid, or clear liquid, is applied to the substrate and black matrix through alternative dipping techniques.

Also shown in the arrangement 100 is a print controller 116. It will be appreciated that the print controller 116 may take a variety of forms. In addition, the print controller may be resident on the printhead assembly 106 or it may be remotely available to the printhead assembly 106, depending on the printing system that is actually implemented. The printhead controller 116 is operative to perform substantial portions of the methods described in connection with the present embodiments by way of software routines stored therein and interaction with suitable hardware that is implemented to carry out the functionality of the software routines.

It should be understood that the arrangement 100 is shown in representative form. It does not include all-of the elements that are typically included in a printing stand for formation of color filter sheets. Of course, those skilled in the art will understand the significance of the elements shown and of those elements not shown.

A method implemented by the system of FIG. 2 involves printing a first fluid (e.g., a clear solvent such as alcohol or water or any other liquid or substance into which other substances are dissolved) in a subpixel. Next, a second fluid (e.g., a color fluid such as red, green or blue ink) is printed on top of the clear fluid. The colorant of the second fluid spreads throughout the first fluid. And, the subpixel dries, resulting in a uniform distribution of colorant or dye.

Figure 3:
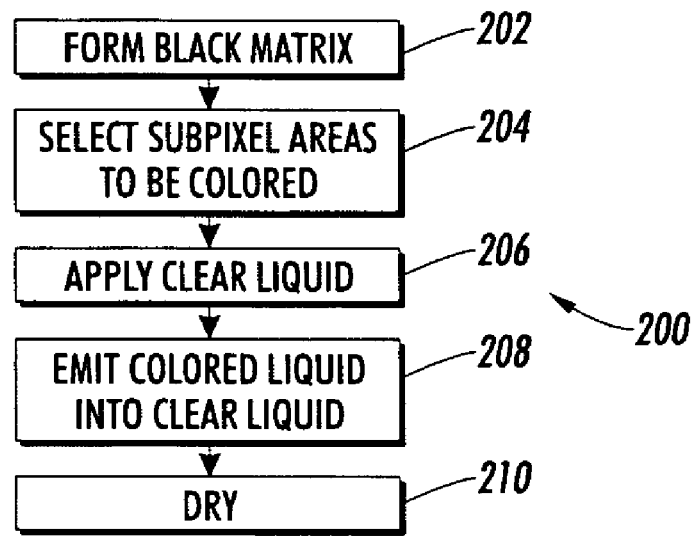
FIG. 3 is a flow chart illustrating a method according to the presently described embodiments.

With reference now to FIG. 3, a method 200 is illustrated. According to this method, boundary elements, e.g., a black matrix, is formed on a substrate (e.g., a glass substrate) (at 202). Of course, it should be understood, the black matrix, or boundary elements defining pixels and subpixel areas, may be formed in a variety of manners that are well known to those skilled in the art. In addition, it should be understood that the formation of the black matrix may not be included within methods according to the presently described embodiments. That is, formation of the black matrix may be accomplished prior to application of the presently described embodiments.

Next, the subpixel areas to be colored are selected (at 204). Of course, these techniques for selecting and identifying subpixel areas to be colored are well known in the art. Indeed, the current technology of printing colorant or dye into the subpixel accomplishes such a step. The advantage of the presently described embodiments is that the droplets do not need to be printed with as much precision as in the prior techniques because the use of the clear liquid will disperse the colorant, evenly throughout the subpixel area.

A first liquid is then applied to the selected subpixel area (at 206). As noted, it should be understood that the first liquid may take the form of a clear liquid or solvent such as alcohol. Many variations of this liquid may be used depending upon the objectives of the process being implemented. For example, liquids having different wetting characteristics may be used depending upon the composition of the substrate and the composition of the black matrix. As those of skill in the art will appreciate, these variations could be substantial depending upon the materials used. In addition, the first fluid may be printed using an arrangement as shown in FIG. 2. Alternatively, the substrate may simply be dipped in the first fluid to apply first fluid to the subpixel areas. This would eliminate the need for a printhead element 114 in the arrangement 100 of FIG. 2. Also, contact or transfer printing techniques may be used to print the first fluid.

Once the clear liquid is applied to a particular subpixel, a second liquid is emitted from the printhead assembly into the clear liquid (at 108). In this step, the printhead assembly simply prints the second liquid into the pool of liquid created in the subpixel. Once the second liquid is in contact with the first liquid, it disperses throughout the first liquid according to the presently described embodiments. In so dispersing, the second liquid becomes evenly distributed throughout the subpixel. It should be understood that the second liquid could take the form of any color liquid, such as ink. The ink may take the form of many different colors including red, green and blue. Of course, many variations of ink could be used depending upon the precise composition of the solvent, and the materials of the substrate and black matrix. Indeed, multiple second fluids (or third fluids, or fourth fluids, etc. etc.) of differing compositions and various amounts may be emitted into the first fluid. The first fluid would, in this case, facilitate mixing. That is, three drops of a second fluid (e.g., a first color) may be followed by 1 drop of another second fluid (e.g., a second color), or a third fluid. Since the first fluid provides a slower drying foundation, the mixing can occur.

It should also be understood that printing may not necessarily be accomplished using an inkjet-type printhead. Contact or transfer printing techniques may be used.

Last, the fluid that is printed is allowed to dry (at 210).

It should be understood that the methods described in connection with FIG. 3 may be implemented in a variety of different manners using software routines and appropriate hardware configurations. In one form, steps 204, 206 and 208 are controlled by the print controller 116 described above.

Figure 4:
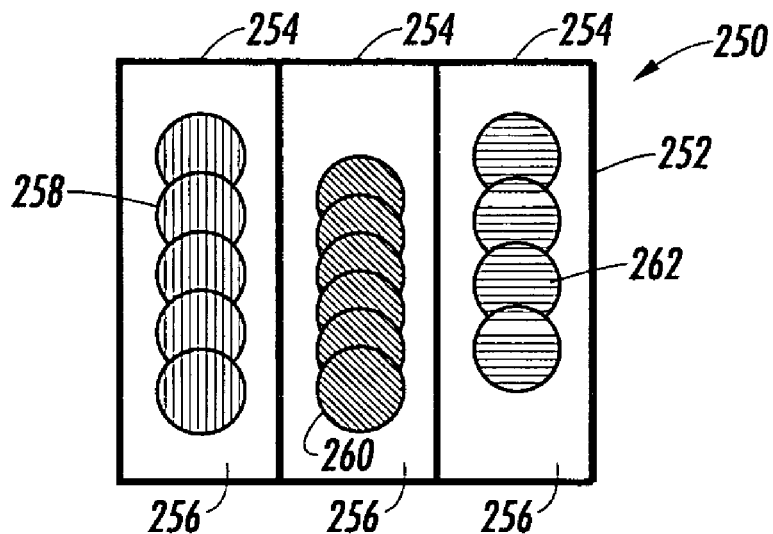
FIG. 4 is an illustration of a pixel to which the presently described embodiments may be applied.

Referring to FIG. 4, a pixel 250 having a black matrix 252 defining subpixels 254 is shown. A first fluid, such as a clear liquid, 256 could be printed onto the substrate to fill the areas of the subpixels 254. The first fluid does not wet to the black matrix. Using the presently described embodiments, droplets of colored liquid can be fired into the subpixel areas at different locations 258, 260 or 262. Their precise placement location within the subpixel is not as important as with other ink jet applications, since the colorant will diffuse throughout the subpixel prior to drying.

Figure 5:
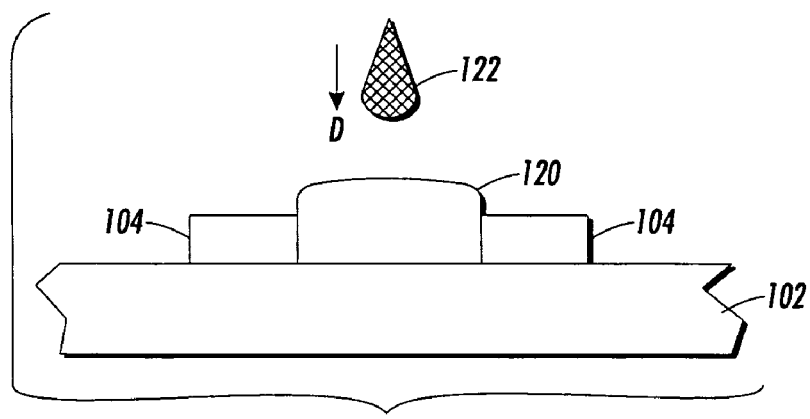
FIG. 5 shows a portion of a method according to the presently described embodiments.
Figure 6:
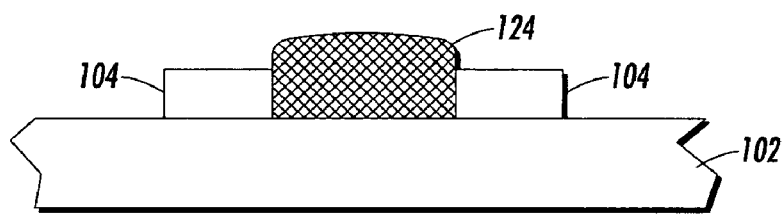
FIG. 6 shows a portion of a method according to the presently described embodiments.
Figure 7:
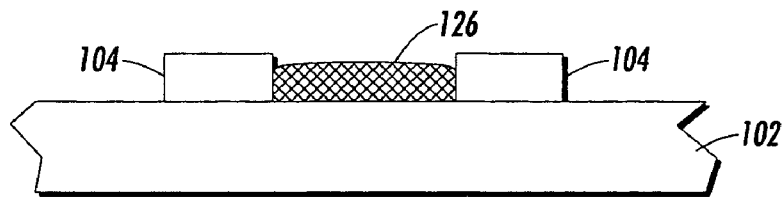
FIG. 7 shows a portion of a method according to the presently described embodiments.

This uniform distribution of color throughout the first fluid (e.g., clear fluid such as solvent) is illustrated in the examples of FIGS. 5, 6 and 7. More particularly, FIG. 5 shows a substrate 102 having a black matrix 104 formed thereon. As shown, a clear fluid 120 has already been applied to the subpixel of the black matrix 104. Note that the first fluid selected in the example of FIG. 5 has suitable surface properties that will allow for a portion of the volume of the first fluid to extend beyond the actual borders of the black matrix 104 without wetting to the black matrix. Therefore, a larger volume of the first fluid may be used without the occurrence of bleeding into the next subpixel. Of course, it should be appreciated that the type of first fluid selected and the volume emitted or applied to the selected, subpixel should take into account the addition of additional volume in the form of droplets of colorant or dye as will be described. Of course, it will be understood that the surface properties of not only the first fluid but also of the second fluid, e.g., colorant or dye, and the matrix are important design factors. A drop of color fluid 122 is shown as traditionally in a direction D and being deposited within the first fluid.

Referring now to FIG. 6, the illustrated fluid 124 is a combination of the drop of second fluid 122 and the first clear fluid 120. As shown, the colorant or dye of the drop 122 becomes evenly dispersed throughout the fluid 120 to form the fluid 124.

FIG. 7 illustrates that as the fluid 124 dries, the volume thereof becomes much less, resulting in printed color 126.

Figure 8:
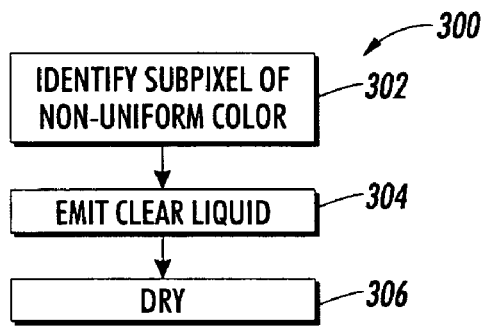
FIG. 8 is a flow chart illustrating a method according to the presently described embodiments.

Referring now to FIG. 8, an additional embodiment is contemplated. In this regard, it should be understood that a first fluid, such as a clear liquid or solvent, may also be used to reliquify a pixel of non-uniform color in order to provide uniformity thereto. If, in the process of printing color filters or thereafter, a non-uniform subpixel is identified, the non-uniformity can be corrected by simply printing, or applying, such a first fluid to the dried or partially dried subpixel.

More particularly, as shown in FIG. 8, a method 300 may be implemented. First, a subpixel of non-uniform color is identified (at 302). It should be understood that identification of such a subpixel may be accomplished in a variety of manners. For example, a human inspector may inspect the color filter and identify such a pixel. In addition, a variety of well known machine vision techniques may be implemented to identify non-uniform color in subpixel areas.

Once the non-uniform color subpixel is identified, the first liquid is emitted thereon (at 304). As above, emission of the droplet is well known in the art. The liquid that is emitted in this case may be a solvent, such as alcohol, or any other liquid that will allow for reliquification of the colored liquid, or ink, that is dried or partially dried within the subpixel.

By reliquifying the pixel, the colorants or dyes will redistribute throughout the subpixel area, resulting in uniform redistribution of color. These subpixels are then allowed to dry (at 306).

As above, the method 300 may be implemented in a variety of manners. For example, the method may be implemented using the arrangement 100 illustrated in FIG. 2, as well as suitable software routines and hardware technique arrangements. In at least one form, steps 302 and 304 of the method 300 are controlled and implemented by the print controller 116 of FIG. 2.

Figure 9:
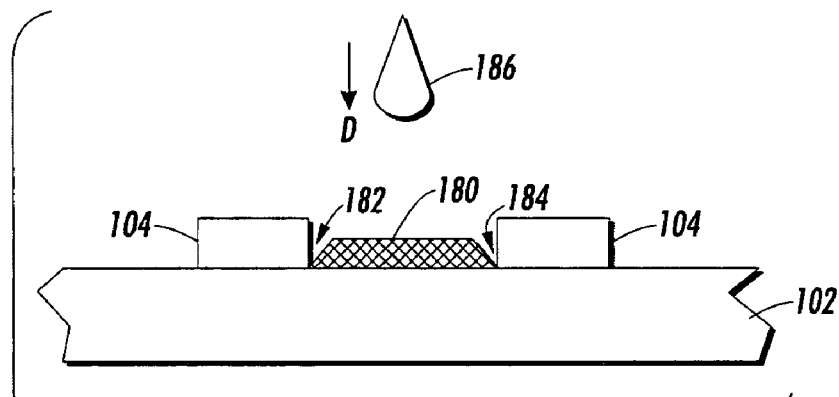
FIG. 9 shows a portion of a method according to the presently described embodiments; and, FIG. 10 shows a portion of a method according to the presently described embodiments.
Figure 10:
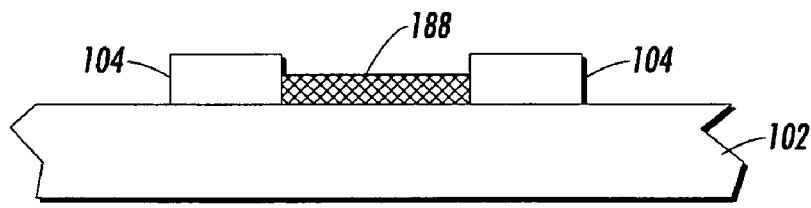

A more detailed illustration of this method 300 is shown in FIGS. 9 and 10. Referring now to FIG. 9, a substrate (e.g., glass substrate) 102 having a black matrix 104 thereon is shown. Notably, the colored liquid 180 does not fill the entire subpixel area (at shown by the gaps 182 and 184 therein), resulting in a non-uniformity. In this process, a droplet of a first fluid, e.g., solvent, 186 from a direction D is applied. The result is shown in FIG. 10, wherein colored material 188 is evenly distributed throughout the area of the subpixel. It should be understood that an extension or variation on this technique is that, if inspection finds a subpixel with uniform but insufficient colorant, it can be corrected. If the subpixel required just one or two more drops worth of colorant, that small amount of ink might not be enough to spread uniformly on top of the dried ink. So prior to adding the one or two drops of ink, the subpixel could be filled with the clear liquid. Then the one of two drops would spread more uniformly over the entire subpixel.

As noted herein, implementation of the presently described embodiments allows for a variety of advantages. First, suitable application or implementation of the presently described embodiments allows for uniform distribution of colorant or dye in a subpixel of a color filter pixel. In this way, complete coverage of the entire subpixel can be completed using uniform distribution of color. As a result, non-uniformity such as scalloping and coffee staining substantially eliminated. At the very least, the system as implemented would reduce the effect of coffee staining in that it would move the effects only to the very edges of the subpixel.

The implementation of the presently described embodiments would also allow for the tuning of droplet quantity during the printing process. Unlike the traditional technology used to print colorants into the subpixels, the accuracy of the colorant placement is relaxed using the presently described embodiments because the colorant can be added to any location within the first fluid and it will diffuse throughout the entire subpixel area, irrespective of its application location. This, of course, will eliminate the need for complicated patterns of colorant throughout droplets to be placed within the subpixel.

The implementation of the presently described embodiments also allows for uniform drying time of the fluid that is applied in each subpixel. This, in itself, will reduce non-uniformities. In addition, the drying time of the fluid that is applied to the subpixel may be varied depending on the fluids that are used. For example, printing may be accomplished with a first fluid, e.g., a clear solvent, which dries more slowly. This might result in a uniformity advantage. It also allows for inspections and corrections prior to complete drying in that the ability to add additional colorant to a subpixel before it dries could be had. As a further example, the first fluid, e.g., a clear solvent, having a rapidly drying composition, might allow for faster production of the color filters.

It should also be appreciated that the presently described embodiments may be implemented using other known arrangements and techniques. For example, as noted, instead of ink jet printing techniques, contact transfer methods such as with quils or striping, or other deposition methods such as ballistic aerosol marking (BAM) may be used to apply the fluids contemplated herein.

While particular embodiments have been described, alternatives, modifications, variations, improvements, and substantial equivalents that are or may be presently unforeseen may arise to applicants or others skilled in the art. Accordingly, the appended claims as filed and as they may be amended are intended to embrace all such alternatives, modifications, variations, improvements, and substantial equivalents.

The invention claimed is:

1. A method for forming a color filter on a substrate comprising:
    forming a plurality of boundary elements on the substrate, the boundary elements defining a plurality of pixel areas, each pixel area comprised of subpixel areas;
    selecting at least one subpixel area;
    applying a first fluid to the selected subpixel area, wherein the first fluid is a clear fluid or solvent and has surface properties that allow for a portion of a volume of the first fluid to extend beyond the boundary elements without wetting the boundary elements, the first fluid being substantially hydrophilic to the substrate but substantially hydrophobic to the boundary elements; and,
    emitting at least one drop of a second fluid into the first fluid within the selected subpixel area after the first fluid is applied to the selected subpixel area, the second fluid being a color liquid dispersing throughout the first fluid whereby color uniformity is achieved in the subpixel area.

2. The method as set forth in claim 1 wherein the substrate is formed of glass.

3. The method as set forth in claim 1 wherein the boundary elements form a black matrix.

4. The method as set forth in claim 1 wherein the applying comprises emitting the first fluid from a print head.

5. The method as set forth in claim 1 wherein the applying comprises using contact or transfer printing techniques.

6. The method as set forth in claim 1 wherein the applying comprises dipping the substrate into the first fluid.

7. The method as set forth in claim 1 wherein the first fluid wets to the substrate.

8. The method as set forth in claim 1 wherein the emitting comprises emitting one of red, green, or blue fluid from a print head.

9. The method as set forth in claim 1 wherein the emitting comprises contact or transfer printing techniques.

10. A method for forming a color filter on a substrate having formed thereon a plurality of boundary elements, the boundary elements defining a plurality of pixel areas, each pixel area comprised of subpixel areas, the method comprising:
    selecting at least one subpixel area;
    applying a first fluid to the selected subpixel area, wherein the first fluid is a clear fluid or solvent and has surface properties that allow for a portion of a volume of the first fluid to extend beyond the boundary elements without wetting the boundary elements, the first fluid being substantially hydrophilic to the substrate but substantially hydrophobic to the boundary elements; and, emitting at least one drop of a second fluid into the first fluid within the selected subpixel area after the first fluid is applied to the selected subpixel area, the second fluid being a color liquid dispersing throughout the first fluid whereby color uniformity is achieved in the subpixel area.

11. The method as set forth in claim 10 wherein the applying comprises emitting the first fluid from a print head.

12. The method as set forth in claim 10 wherein the applying comprises dipping the substrate into the first fluid.

13. The method as set forth in claim 10 wherein the emitting comprises emitting one of red, green, or blue fluid from a print head.

14. A method for forming a color filter on a substrate comprising:

forming a plurality of boundary elements on the substrate, the boundary elements defining a plurality of pixel areas, each pixel area comprised of subpixel areas;

selecting at least one subpixel area;

applying a first fluid to the selected subpixel area, wherein the first fluid is a clear fluid or solvent and has surface properties that allow for a portion of a volume of the first fluid to extend beyond the boundary elements without wetting the boundary elements, the first fluid having higher wettability to the substrate then to the boundary elements; and, emitting at least one drop of a second fluid into the first fluid within the selected subpixel area after the first fluid is applied to the selected subpixel area, the second fluid being a color liquid dispersing throughout the first fluid whereby color uniformity is achieved in the subpixel area.

15. The method as set forth in claim 14 wherein the substrate is formed of glass.

16. The method as set forth in claim 14 wherein the boundary elements form a black matrix.

17. The method as set forth in claim 14 wherein the applying comprises emitting the first fluid from a print head.

18. The method as set forth in claim 14 wherein the applying comprises using contact or transfer printing techniques.

19. The method as set forth in claim 14 wherein the applying comprises dipping the substrate into the first fluid.

20. The method as set forth in claim 14 wherein the emitting comprises emitting one of red, green, or blue fluid from a print head.

21. The method as set forth in claim 14 wherein the emitting comprises contact or transfer printing techniques.

22. A method for forming a color filter on a substrate having formed thereon a plurality of boundary elements, the boundary elements defining a plurality of pixel areas, each pixel area comprised of subpixel areas, the method comprising:

selecting at least one subpixel area;

applying a first fluid to the selected subpixel area, wherein the first fluid is a clear fluid or solvent and has surface properties that allow for a portion of a volume of the first fluid to extend beyond the boundary elements without wetting the boundary elements, the first fluid having higher wettability to the substrate than to the boundary elements; and, emitting at least one drop of a second fluid into the first fluid within the selected subpixel area after the first fluid is applied to the selected subpixel area, the second fluid being a color liquid dispersing throughout the first fluid whereby color uniformity is achieved in the subpixel area.

23. The method as set forth in claim 22 wherein the applying comprises emitting the first fluid from a print head.

24. The method as set forth in claim 22 wherein the applying comprises dipping the substrate into the first fluid.

25. The method as set forth in claim 22 wherein the emitting comprises emitting one of red, green, or blue fluid from a print head.

* * * * *